United States Patent
Göhrle et al.

(10) Patent No.: US 9,868,333 B2
(45) Date of Patent: Jan. 16, 2018

(54) METHOD OF OPERATING AN ACTIVE SUSPENSION

(71) Applicant: AUDI AG, Ingolstadt (DE)

(72) Inventors: Christoph Göhrle, Ingolstadt (DE); Andreas Unger, Nürnberg (DE)

(73) Assignee: AUDI AG, Ingolstadt (DE)

( * ) Notice: Subject to any disclaimer, the term of this patent is extended or adjusted under 35 U.S.C. 154(b) by 4 days.

(21) Appl. No.: 14/808,684

(22) Filed: Jul. 24, 2015

(65) Prior Publication Data
US 2016/0023531 A1    Jan. 28, 2016

(30) Foreign Application Priority Data
Jul. 25, 2014    (DE) .................. 10 2014 011 162

(51) Int. Cl.
*B60G 17/018*    (2006.01)
*B60G 17/06*    (2006.01)

(52) U.S. Cl.
CPC .......... *B60G 17/018* (2013.01); *B60G 17/06* (2013.01); *B60G 2400/102* (2013.01); *B60G 2400/206* (2013.01); *B60G 2500/10* (2013.01); *B60G 2500/104* (2013.01)

(58) Field of Classification Search
CPC .................. B60G 17/018; B60G 17/06; B60G 2400/206; B60G 2400/102; B60G 2500/104; B60G 2500/10
See application file for complete search history.

(56) References Cited

U.S. PATENT DOCUMENTS

| | | | | |
|---|---|---|---|---|
| 4,696,489 A | * | 9/1987 | Fujishiro | B60G 17/018 280/5.507 |
| 4,838,574 A | * | 6/1989 | Baraszu | B60G 17/0165 280/5.515 |
| 5,712,783 A | * | 1/1998 | Catanzarite | B60G 17/015 180/378 |

(Continued)

FOREIGN PATENT DOCUMENTS

| | | |
|---|---|---|
| DE | 103 20 809 | 11/2004 |
| DE | 10 2005 014 237 | 10/2006 |
| DE | 10 2008 046 876 | 3/2010 |

OTHER PUBLICATIONS

Sammier, Damien, Olivier Sename, and Luc Dugard. "Skyhook and H8 control of semi-active suspensions: some practical aspects." Vehicle System and Dynamics 39.4 (2003): 279-308.*

*Primary Examiner* — Genna M Mott
(74) *Attorney, Agent, or Firm* — Henry M. Feiereisen LLC

(57) ABSTRACT

In a method of operating an active suspension of a motor vehicle, power is added to at least one active control element of the active suspension, arranged between a wheel and a body, for damping a movement of the motor vehicle in a vertical direction when negotiating a terrain to thereby influence at least one control variable of the suspension, which control variable is oriented in the vertical direction. A first signal of a velocity of the body in the vertical direction and a second signal of the at least one control variable are determined. After ascertaining a phase shift between the first and second signals, a value of the phase shift is compared with a predefined threshold value. The presence of excitation is identified for the vertical body movement, when the value of the phase shift deviates from the threshold value at least by a tolerance value.

10 Claims, 2 Drawing Sheets

(56) References Cited

U.S. PATENT DOCUMENTS 8,762,000 B2 2/2014 Schindler et al.
2011/0160960 A1* 6/2011 Kajino ............... B60G 17/0157
  701/38

* cited by examiner

METHOD OF OPERATING AN ACTIVE SUSPENSION

CROSS-REFERENCES TO RELATED APPLICATIONS

This application claims the priority of German Patent Application, Serial No. 10 2014 011 162.8, filed Jul. 25, 2014, pursuant to 35 U.S.C. 119(a)-(d), the disclosure of which is incorporated herein by reference in its entirety as if fully set forth herein.

BACKGROUND OF THE INVENTION

The present invention relates, in general, to the field of operating an active suspension of a motor vehicle.

The following discussion of related art is provided to assist the reader in understanding the advantages of the invention, and is not to be construed as an admission that this related art is prior art to this invention.

An active suspension, with which, e.g., operation in all four quadrants is controlled, is used to significantly reduce a movement of the vehicle body when travelling along an uneven roadway. Active control elements of the active suspension are hereby activated in such a way that the control elements maintain the body still by equalizing a body movement. The difference to a passive or semi-active suspension resides in a temporary addition of power to the control elements of the active suspension to stabilize the body and not only in a dissipation of power, so that the body can be stabilized more effectively.

As the motor vehicle travels, various faults may be encountered, which are caused, for example, as a result of incorrectly installed sensors, calculation errors by a control unit, transmission faults in a network (bus), etc., so that actuators of the motor vehicle are incorrectly operated. In the event of an encountered fault, there is a chance that control variables have no damping effect on a body movement, but instead the body is subject to excitation from a road profile. In other words, the energy of a vibration of the body is increasingly stimulated or stoked further, ultimately causing a so-called resonance disaster, with the movement of the body becoming unstable. This is possible only when an active suspension is involved because in contrast to passive or semi-active suspensions, power can be added into the system only in an active suspension. Conventional techniques for avoiding faults are not focused on the behavior of the motor vehicle in a closed-loop control circuit but are experienced only at a lower level, e.g. when calculating checksums for a signal transfer or a mutual plausibility of several signals.

As a profile of a terrain, normally a road, excites the motor vehicle during travel but is unknown, and only a reaction of the motor vehicle can be measured as it travels on the road, it is difficult to check the presence or absence of excitation. There is no way to distinguish whether a measuring variable, such as, e.g., the acceleration, progressively increases because the motor vehicle is subject to excitation from the road, which means that a damping function would be in order, or because the actuators of the suspension causes increasingly greater control variables as a result of a faulty control, which means that the damping function would not be in order. If there is no possibility to identify excitation, the function cannot be disabled in the event of a fault so that a power circuit has to be cut to reduce occurring vibrations again.

It would therefore be desirable and advantageous to address prior art shortcomings.

SUMMARY OF THE INVENTION

According to one aspect of the present invention, a method of operating an active suspension of a motor vehicle includes adding power to at least one active control element of the active suspension, arranged between a wheel and a body, for damping a movement of the motor vehicle in a vertical direction when negotiating a terrain to thereby influence at least one control variable of the suspension, which control variable is oriented in the vertical direction, determining a first signal of a velocity of the body in the vertical direction and a second signal of the at least one control variable, determining a phase shift between the first and second signals, comparing a value of the phase shift with a predefined threshold value, and identifying the presence of excitation of the vertical body movement, when the value of the phase shift deviates from the threshold value at least by a tolerance value.

In accordance with the present invention, excitation of the vehicle body can be identified, when, as at least one condition, the value of the phase shift deviates from the threshold value by at least a tolerance value. This is normally the case, when the value for the phase shift is greater than the threshold value.

An active control element of the active suspension, via which the wheel is connected to the body, is configured as damper, for which a damping rate can be variably adjusted, as spring, or as actuator. At least one active control element is controlled by a method according to the invention and thus operated by an open-loop control and/or closed-loop control, with power being added to the at least one control element to thereby damp a vertical body movement. An excitation monitor is able to check the presence or absence of excitation. Excitation is caused, for example, when a normally periodic stimulation by the at least one control element causes excessive vertical body movement.

According to another advantageous feature of the present invention, the at least one active control variable of the active suspension and/or the at least one active control element can be a path traveled in the vertical direction and/or a force acting in the vertical direction.

According to another advantageous feature of the present invention, an acceleration of the body can be measured in the vertical direction by a sensor, and the velocity of the body in the vertical direction can be calculated through integration.

According to another advantageous feature of the present invention, each of the first and second signals can be filtered by a high-pass filter and a low-pass filter.

As described above, the at least one condition for the presence of excitation involves a comparison of a value of the phase shift with a predefined threshold value. The signal of the velocity of the body may hereby be compared in the vertical direction with a signal of several sensorically measured control variables which are vertically oriented. An at least one further condition involves, as will be described hereinafter, a monitoring of energy converted during movement in vertical direction.

For that purpose, energy resulting from the velocity of the body in the vertical direction can be determined and compared with a predefined threshold value, wherein the excitation of the movement is identified in the vertical direction, when the value of the determined energy deviates from the threshold value at least by a tolerance value. This is normally the case, when the value is greater than the threshold value.

In order to evaluate on the basis of the monitored condition the presence or absence of excitation, the conditions are weighted according to their relevancy. The presence of excitation is already identified, when only one condition, normally a deviation of the phase shift from the desired value, is met. It is, however, also possible to identify excitation only when at least a further condition has been met, or all conditions have been met.

In an optional variant of a method according to the invention, the body can be connected according to the Skyhook principle via a virtual damper with a reference system. The Skyhook principle forms hereby a basis for the excitation monitor.

The Skyhook theory is based on a targeted damping of the body of the motor vehicle with a virtual damper having a damping constant $d_{sky}$. The Skyhook theory is implemented by determining as operating parameter an acceleration of the body in the vertical direction, and by integrating it over time and filtering it. A velocity of the body is hereby calculated in the vertical direction and through manipulation of the actuator with the Skyhook function a force as a control variable, which is oriented in the vertical direction, is provided in proportional relation to the velocity of the body in the vertical direction. An action resultant from the Skyhook function is provided to the virtual damper which is connected to the body and uses an inertial reference system, e.g. the sky, as reference. This is the reason why the function is also referred to as Skyhook because the body of the motor vehicle is connected according to a predefined definition via the virtual damper with the sky so that the motor vehicle appears to float over a ground, normally a road, during the ride. Taking this into account, the phase of the velocity of the body is compared with the phase of the active control variables.

When identifying the presence of excitation of the body movement in the vertical direction, a counter measure is initiated. For that purpose, the operation of the at least one active control element is adjusted by reducing power added to the at least one active control element for damping the vertical body movement.

According to another aspect of the present invention, a method of operating a plurality of active suspensions of a motor vehicle having plural wheels, with each of the active suspensions being respectively arranged between a wheel and a body of the motor vehicle provides for operating each active suspension by the method as described above. Thus, it is taken into account that the vertical body movement is influenced by all active suspensions of the motor vehicle, with each active suspension connecting a wheel with the body of the motor vehicle.

According to still another aspect of the present invention, an operating system for a motor vehicle includes an active suspension arranged between a wheel and a body of the motor vehicle and having at least one active control element configured to damp a movement of the motor vehicle in a vertical direction when negotiating a terrain by adding power to thereby influence at least one control variable of the suspension, which control variable is oriented in the vertical direction, and a control unit configured to determine a first signal of a velocity of the body in the vertical direction and a second signal of the at least one control variable, and to determine a phase shift between the first and second signals, with the control unit comparing a value of the phase shift with a predefined threshold value, and identifying the presence of excitation of the vertical body movement, when the value of the phase shift deviates from the threshold value at least by a tolerance value.

The provision of the control unit allows control of all steps of the method according to the present invention, with the control unit being configured to add power to the at least one active control element in order to be able to provide initially a damping of the vertical body movement. In the event, this causes a excitation, the value of the initially added power is decreased again. The system allows implementation of all steps of both methods according to the invention.

With both methods, the presence of excitation of the body of the motor vehicle in the vertical direction can be recognized using the Skyhook function or Skyhook principle.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
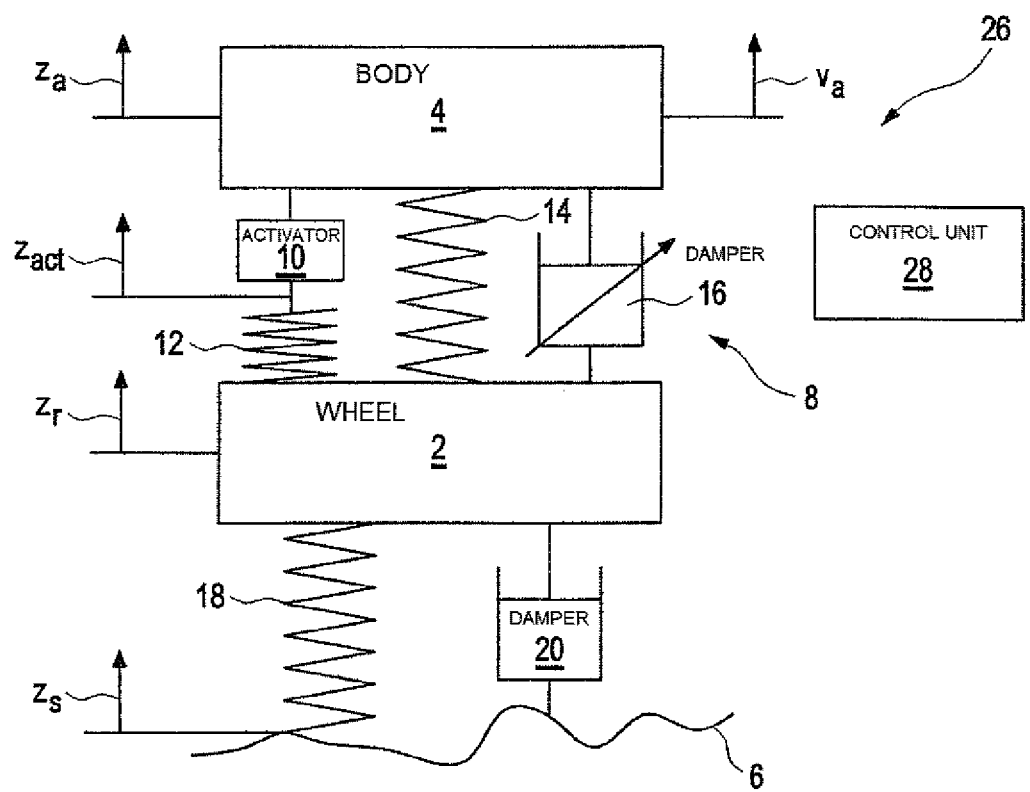
FIG. 1 is a schematic illustration of a system according to the present invention, with an exemplary active suspension of a motor vehicle for executing a method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a system according to the present invention, generally designated by reference numeral 26, with an exemplary active suspension of a motor vehicle, generally designated by reference numeral 8. The motor vehicle 8 includes a wheel 2 and a body 4 and negotiates a terrain 6. The active suspension 8 includes control elements to connect the wheel 2 and the body 4 to one another and to enable mechanical interaction there between. The active control elements of the active suspension 8 involve an actuator 10 and a first spring 12, which are arranged in series between the wheel 2 and the body 4, a second spring 14, and a damper 16 which has a damping rate that can be variably adjusted. The second spring 14 and the damper 16 are arranged between the wheel 2 and the body 4 in parallel relationship to one another and also in parallel relationship to the actuator 10 and the first spring 12.

An interaction between the wheel 2 and the terrain 6 is illustrated here by a wheel spring 18, also referred to as tire spring, and by a wheel damper 20 or tire damper in parallel relationship to the wheel spring 18.

The system 26 according to the present invention includes a control unit 28 for controlling and thus to operate by way of an open-loop control and/or closed-loop control at least functions of the control elements of the active suspension 8. Provision is hereby made for configuring the control elements of the active suspension 8 also as components of the system 26. Depending on the definition, also the wheel 2 and the body 4 as well as the wheel spring 18 and the wheel damper 20 may form components of the system 26.

FIG. 1 further shows several operating parameters, indicated by vectors, namely a distance $z_a$ by which the body 4 moves in a vertical direction, as the motor vehicle travels the terrain 6, a velocity $v_a$ of the body 4 in the vertical direction, a distance $z_{act}$ by which at least one component of the active suspension 8 is moved in the vertical direction, a distance $z_r$ traveled by the wheel 2 in the vertical direction, and a roadway $z_s$, formed here by the terrain 6, and changing in the vertical direction relative to the wheel 2.

All operating parameters to be considered within the scope of the method according to the present invention and including all control variables, are ascertained by at least one sensor, not shown in greater detail. Any values of the operating parameters ascertained by the sensor are transmitted as signals to the control unit 28.

Figure 2:
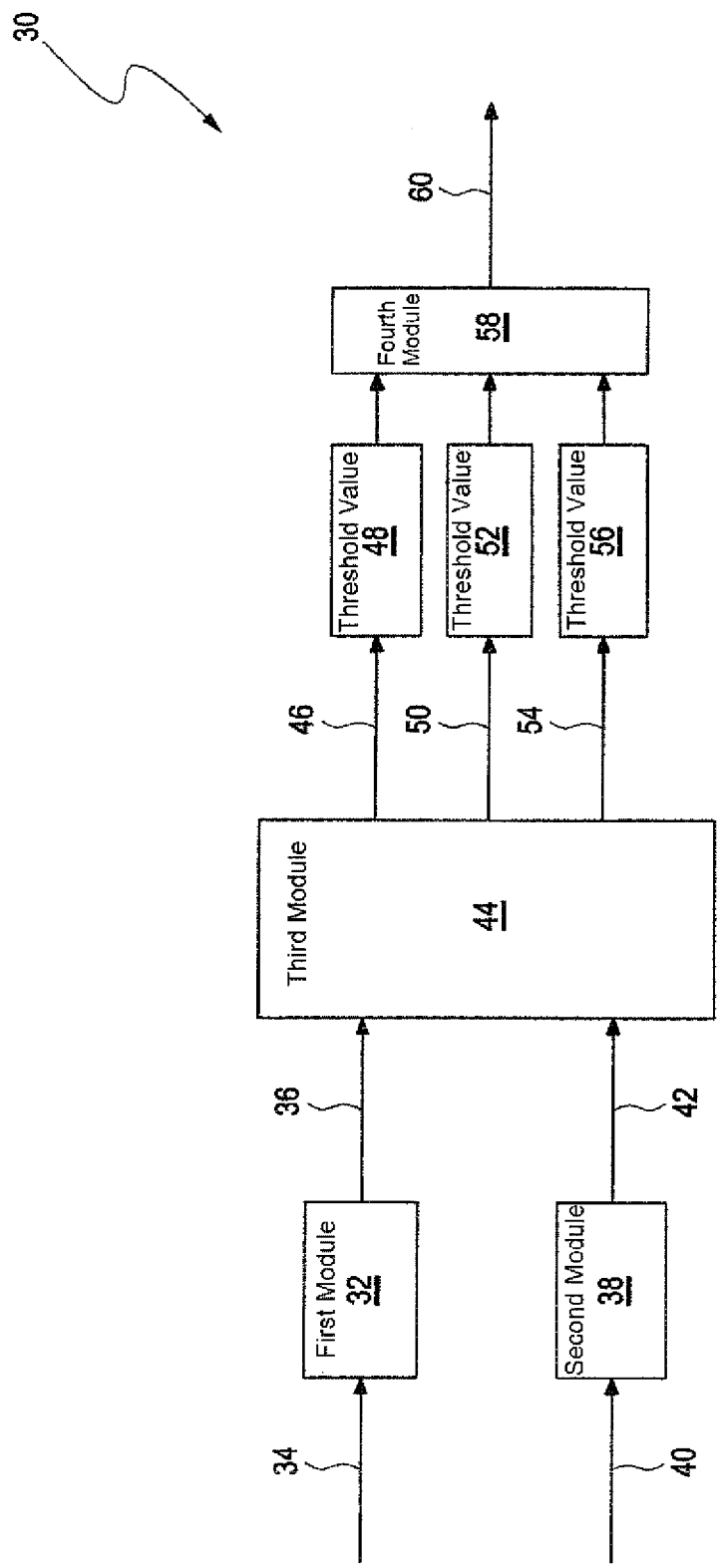
FIG. 2 is a schematic illustration of a function of an excitation monitor for implementing the method according to the present invention.

The control unit 28 controls a function of at least one active control element, i.e. the actuator 10, at least one of the springs 12, 14 and/or the damper 16 of the active suspension 8, with power being added to the least one active control element in order to damp a vertical movement of the body 4. The control unit 28 considers hereby the Skyhook function. Moreover, the control unit 28 provides an excitation monitor which is configured to analyze a damping effect of the at least one control element of the suspension 8 upon the body 4, with the excitation monitor being based on the Skyhook function and thus on the Skyhook principle. The excitation monitor provided and/or realized by the control unit 28 and its operation is shown in the illustration of FIG. 2 and generally designated there by reference numeral 30.

At least one reaction of the body 4 and thus also a reaction of the motor vehicle is dependent on an excitation from the profile of the terrain 6 and transmitted via the wheel spring 18 and wheel damper 20 along the roadway $z_s$ formed by the terrain 6 in the vertical direction, and via forces as active control variables which are manipulated by the active control elements of the active suspension 8. When a phase shift or phase offset of two operating parameters exceeds a defined threshold value, then this gives a first indication for the presence of excitation. When, in addition, an amplitude of a signal of at least one operating parameter, i.e. at least of the velocity $v_a$ of the body 4 and/or at least a distance traveled, or at least a changing height $z_{act}$ as active control variable, substantially increases, then this is even further evidence for the presence of excitation. It can be derived from a value of the amplitude of the at least one signal as to how much mechanical power is generated by a movement which correlates with the at least one operating parameter.

A reaction of the motor vehicle, i.e. of the body 4 and the wheel 2, and active control variables as operating parameters of the active control elements are measured by at least one sensor and thus are known, whereas an excitation caused by the profile of the ground 6 is unknown. The excitation monitor takes into account the measured and provided operating parameters and/or control variables. Moreover, the excitation monitor is independent from a control structure of the active suspension 8.

A value for a distance traveled in the vertical direction as the motor vehicle negotiates the terrain 6, or a changing height $z_{act}$, or a force as active control variable of the active suspension 8 has a damping effect, when acting in a same direction as the velocity $v_a$ of the body 4.

FIG. 2 shows a schematic illustration of the excitation monitor 30 and its function. A first module 32 configured to execute an integration and both a filtering with a high-pass filter and a low-pass filter, here at 1 Hz, receives a measured signal 34 for illustration of an acceleration of the body 4 over time in the vertical direction. Through integration of the signal 34 of the chronological sequence of the acceleration, the first module 32 calculates a signal 36 to illustrate the velocity $v_a$ of the body 4 over time in the vertical direction.

A second module 38 of the excitation monitor 30 is configured to execute both a filtering with a high-pass filter and a filtering with a low -pass filter, here at 1Hz., and receives a signal 40 for illustration of at least one measurable control variable over time, i.e. a , a distance $z_{act}$ as travelled by a control element of the active suspension 8, the wheel 2, or the body 4 in the vertical direction, and/or a force acting in the vertical direction. The signal 40 is filtered by the second module 38 which outputs a signal 42 with a filtered chronological sequence of the at least one sensorically measurable active control variable which is oriented in the vertical direction.

A third module 44, configured for estimating a phase and an amplitude of a signal, receives from the first module 32 the signal 36 for illustration of the chronological sequence 36 of the velocity $v_a$ of the body 4, and receives from the second module 38 the signal 42 with the filtered chronological sequence of the measurable control variable.

The third module 44 calculates a signal 46 for a phase shift and thus a difference in time or time-staggered sequence between the signals 36, 42, i.e. the signal 36 for the velocity $v_a$ of the body 4 and the filtered signal 42 for the at least one sensorically measurable control variable. This phase shift 46 is compared with a predefinable threshold value 48 for the phase shift 46. The third module 44 further determines a value for an energy 50 of the velocity $v_a$ of the body 4 and compares it with a predefinable threshold value 52. In addition, the third module 44 determines a value for an energy 54 of the measurable active control element and compares it with a predefinable threshold value 56.

A fourth module 58 analyzes the phase shift 46 and the energies 50, 54 by taking into account the provided threshold values 48, 52, 56, respectively, and determines an excitation index 60 which gives information about the presence or absence of excitation of the movement of the body 4 in the vertical direction.

The at least one sensor of the motor vehicle measures the vertical acceleration of the body 4 and the resultant signal 34 is integrated by the first module 32 over time, with the vertical velocity $v_a$ of the body 4 being determined. To prevent a possible drift during integration, the calculated acceleration of the body 4 is initially filtered with a high-pass filter of the first module 32. A following low -pass filter of the first module 32 ensures that the signal 36 for the vertical velocity $v_a$ of the body 4 contains only frequency proportions that are relevant for excitation. Cut-off frequencies of both filters, i.e. the high-pass filter and the low -pass filter, are adjusted to a value of a natural frequency of the vertical body movement, e.g. 1 Hz. The natural frequency of the vertical body movement, is dependent on a mass of the body 4, a spring stiffness of the springs 12, 14 of the suspension, and on a damping magnitude or damping rate of the suspension 8 that is dependent on the variably adjustable damping rate of the damper 16.

The signal 40 for the at least one active control variable, with a force and/or a path of the active suspension 8 in vertical direction being used in dependence on the embodiment of the active suspension 8, is filtered by the second module 38 in a same way and/or extent as the signal that has been filtered by the first module 32 for the velocity $v_a$ of the body 4 in the vertical direction. Thus, a comparable phase position is provided for the signal 36 for illustrating a chronological sequence of the velocity $v_a$ of the body 4 in the vertical direction and for the signal 42 with the filtered chronological sequence of the at least on measurable active control variable which is oriented in the vertical direction.

During the following processing step, which is executed by the third module 44, the phase and the amplitude of both signals 36, 42 are estimated. The phase describes hereby whether one of the signals 36, 42 leads or trails the other one of the signals 36, 42. When the signals 36, 42 oscillate in opposite directions, a value for the phase shift 46 amounts to 180°. The amplitude of each signal 36, 42 is determined by using a square root-mean-square value or mean value, the so-called r.m.s. value. A value for mechanical energy can be derived from the amplitude and is established by a movement which is described with the respective signal 36, 42.

The values for the phase shift 46 and the energy 50, 54 are determined in a moving window, with a width of the moving window being established by a defined controlling parameter. A broader moving window results in smoother signals but also to a more sluggish response to events. The window can have a width of 2 seconds for example.

Normally, the signal 36 for the velocity $v_a$ of the body 4 in the vertical direction and the signal 42 of the at least one active control variable which is oriented in the vertical direction should be in an adjustable tolerance band which is established by the threshold value 48 and a tolerance value. Both signals 36, 42 should under no circumstances be in phase opposition, so that the phase shift 46 between the two signals 36, 42 may not amount to 180°, when values for the energy 50, 54 of movements which are described by the two signals 36, 42 exceed the provided adjustable threshold values 52, 56.

To check this condition, estimated values for the phase shift 46 and the energy 50, 54 are compared with the threshold values 48, 52, 56, respectively. A maximum permissible threshold value 48 for the phase shift 46 can hereby be defined which may amount to 140° for example. When the value for the phase shift 46 between the signals 36, 42 is less than the defined threshold value 48, then there is no excitation so that the excitation index 60 has the value zero. When the value of the phase shift 46 is, however, greater than the threshold value 48 and when, in addition, values of the amplitudes of the signals 36, 42 exceed the provided and/or definable threshold values 52, 56, the excitation index 60 has the value one which triggers the need to apply counter measures to reduce the identified excitation. Thus, the presence of excitation is recognized, when three conditions are met by exceeding the three threshold values 48, 52, 56. A counter measure involves hereby a decrease of the power that has been added to damp the vertical body movement.

As an alternative, it is also conceivable for the excitation index 60 to assume the value one and to identify the presence of excitation, when at least one single value to be monitored, e.g. the value for the phase shift 46, deviates at least by the tolerance value from a threshold value provided for this purpose.

A behavior of the body 4 of the motor vehicle and a suspension 8, which is associated to a wheel 2, is thus monitored. As a result, the method according to the present invention is executed at least for a part vehicle model, e.g. quarter vehicle model, in the event the motor vehicle has a total of four wheels 2 for its advance movement. The method can also be applied to a full-vehicle model, with a behavior of the suspension 8, which is associated to all wheels 2, and the body being monitored. In this case, a total of four excitation monitors are provided, wherein to each suspension 8 of a wheel 2 an excitation monitor is associated on a corner of the motor vehicle. A velocity $v_a$ for the body 4 is calculated in this case with the aid of a pitch and/or roll of the entire motor vehicle. As an alternative, provision may be made for three excitation monitors which are modally activated and/or realized and respectively configured for monitoring a stroke, pitch and roll of the body 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of operating an active suspension of a motor vehicle, said method comprising:
   adding power to at least one active control element of the active suspension, arranged between a wheel and a body, for damping a movement of the motor vehicle in a vertical direction when negotiating a terrain to thereby influence a control variable of the suspension, wherein the control variable of the active suspension is a path traveled in the vertical direction or the control variable of the active suspension is a force acting in the vertical direction;
   determining a first signal of a velocity of the body in the vertical direction and a second signal of the control variable;
   determining a value for a mechanical energy derived from the second signal;
   comparing the mechanical energy with a predefined threshold value for the mechanical energy;
   determining a phase shift between the first and second signals;
   comparing a value of the phase shift with a predefined threshold value;
   identifying a presence of excitation of the vertical body movement when the value of the phase shift deviates from the predefined threshold value at least by a tolerance value or when the value of the phase shift is greater than the predefined threshold value so that an excitation index has the value one.

2. The method of claim 1, further comprising measuring an acceleration of the body in the vertical direction, and calculating the velocity of the body in the vertical direction through integration.

3. The method of claim 1, further comprising determining the mechanical energy resulting from the control variable in the vertical direction, wherein the excitation of the movement is identified in the vertical direction, when the value of the determined mechanical energy deviates from the predefined threshold value for the mechanical energy at least by a tolerance value for the mechanical energy.

4. The method of claim 1, further comprising connecting the body according to the Skyhook principle via a virtual damper with a reference system.

5. The method of claim 1, further comprising initiating a counter measure, when identifying the presence of excitation of the movement in the vertical direction.

6. The method of claim 1, further comprising filtering each of the first and second signals by a high-pass filter and a low-pass filter, said high-pass filter and low-pass filter having a cut-off at 1 Hz.

7. A method of operating a plurality of active suspensions of a motor vehicle, with the active suspensions being arranged respectively between a wheel of plural wheels and a body of the motor vehicle, said method comprising:
adding power to at least one active control element of each of the active suspension for damping a movement of the motor vehicle in a vertical direction when negotiating a terrain to thereby influence a control variable of the suspension, wherein the control variable of the active suspension is a path traveled in the vertical direction or the control variable of the active suspension is a force acting in the vertical direction;
determining a first signal of a velocity of the body in the vertical direction and a second signal of the control variable;
determining a value for a mechanical energy derived from the second signal;
comparing the mechanical energy with a predefined threshold value for the mechanical energy,
determining a phase shift between the first and second signals;
comparing a value of the phase shift with a predefined threshold value;
identifying a presence of excitation of the vertical body movement when the value of the phase shift deviates from the predefined threshold value at least by a tolerance value or when the value of the phase shift is greater than the predefined threshold value so that an excitation index has the value one.

8. The method of claim 7, further comprising filtering each of the first and second signals by a high-pass filter and a low-pass filter, said high-pass filter and low-pass filter having a cut-off at 1 Hz.

9. An operating system for a motor vehicle, comprising:
an active suspension arranged between a wheel and a body of the motor vehicle and having at least one active control element configured to damp a movement of the motor vehicle in a vertical direction when negotiating a terrain by adding power to thereby influence a control variable of the suspension, wherein the control variable of the active suspension is a path traveled in the vertical direction or the control variable of the active suspension is a force acting in the vertical direction;
a control unit configured to determine a first signal of a velocity of the body in the vertical direction and a second signal of the control variable, said control unit further being configured to determine a value for a mechanical energy derived from the second signal to compare the mechanical energy with a predefined threshold value for the mechanical energy, and to determine a phase shift between the first and second signals, said control unit comparing a value of the phase shift with a predefined threshold value, identifying a presence of excitation of the vertical body movement when the value of the phase shift deviates from the predefined threshold value at least by a tolerance value or when the value of the phase shift is greater than the predefined threshold value so that an excitation index has the value one.

10. The operating system of claim 9, further a comprising a high-pass filter and a low-pass filter for filtering each of the first and second signals, said high-pass filter and low-pass filter having a cut-off at 1 Hz.

* * * * *